United States Patent [19]

Harwood et al.

[11] Patent Number: 4,693,649
[45] Date of Patent: Sep. 15, 1987

[54] SHARP EDGE FORMATION ON COPPER HEATSINKS

[75] Inventors: Robert E. Harwood, Princeton; Frank Z. Hawrylo, Trenton, both of N.J.

[73] Assignee: RCA Corporation, Princeton, N.J.

[21] Appl. No.: 735,163

[22] Filed: May 17, 1985

[51] Int. Cl.⁴ .............................................. B23D 1/26
[52] U.S. Cl. .................................. 409/293; 409/300; 409/303; 29/566.1
[58] Field of Search ............... 409/293, 297, 298, 300, 409/301, 303, 345, 346, 131, 132, 140, 138, 308, 319, 338, 339, 340, 343, 347, 348; 407/67, 68, 69, 70, 71; 29/50, 565, 566.1, 566

[56] References Cited

U.S. PATENT DOCUMENTS

| | | |
|---|---|---|
| 218,249 | 8/1879 | Fields . |
| 641,469 | 1/1900 | Royle . |
| 1,281,965 | 10/1918 | Hutchinson . |
| 2,936,679 | 5/1960 | Thuerwachter ................... 409/345 |

FOREIGN PATENT DOCUMENTS

| | | | |
|---|---|---|---|
| 228091 | 3/1960 | Australia ............................ | 409/301 |
| 809741 | 8/1951 | Fed. Rep. of Germany ...... | 409/346 |
| 810512 | 3/1959 | United Kingdom ................ | 407/71 |

Primary Examiner—Z. R. Bilinsky
Assistant Examiner—A. Dougas
Attorney, Agent, or Firm—Harley R. Ball; Theodore R. Furman

[57] ABSTRACT

An apparatus and method for imparting a sharp, defect-free outside corner of a desired angle to a metal workpiece are disclosed. The apparatus comprises two separate cutting tools, each with a distinct cutting direction. The tools are juxtaposed such that their leading surfaces are adjacent to each other and that their respective cutting edges intersect at the desired angle. This provides that the cutting directions of each tool are opposite one another. In using the improved cutting apparatus, the workpiece is secured and the apparatus must be movable along the x, y and z axes. By cutting the first and second surfaces of the workpiece in sequence with the first and second cutting edges of the present apparatus respectively, a sharp defect-free corner of the desired angle can be imparted to the workpiece. A specific application for the present invention is in the fabrication of intricate copper products, such as heatsinks for semiconductor devices.

6 Claims, 8 Drawing Figures

SHARP EDGE FORMATION ON COPPER HEATSINKS

The Government has rights in this invention pursuant to a Government Contract.

This invention relates to an apparatus and method for forming 90 degree corners on a metal workpiece, and more particularly, to the use of such an apparatus and method in the manufacture of semiconductor optoelectronic devices.

BACKGROUND OF THE INVENTION

In the manufacture of semiconductor optoelectronic devices it is well known to mount a light emitting diode onto a copper heatsink. The excellent thermal conductivity of the copper enables it to dissipate much of the heat generated during the operation of the device. In order for the diode to benefit from the heatsinking capabilities of the copper, a good bond must be formed between the diode and the heatsink. Therefore, the mounting surface of the heatsink should be flat, smooth and defect-free.

Also, many such devices are coupled with an optical fiber. One such coupling comprises mounting the diode on the top surface of the heatsink and butting the fiber against the front surface of the heatsink, which surface should be at a 90° angle from the top surface. This requires that the top surface and front surface of the heatsink must be smooth and flat and also that these surfaces form a 90° corner.

A problem with copper is that it is known to produce burrs when cut or machined. When the top surface of a copper block is machined, a burr is formed in the direction of the machining. Upon machining the front surface of the copper block, the first burr is removed but a second burr is formed in the direction of the secondary machining. It is virtually impossible, in such a method, to end up without a burr on the corner of the copper block. Also, typical machining methods, such as milling, leave the copper surfaces flat, but not smooth enough for semiconductor device mounting.

Precision grinding and lapping of the surfaces can product flat smooth surfaces, but the abrasive medium used typically becomes impregnated in the copper surface. This type of contamination can adversely affect the thermal conductivity of the copper. Also since the copper is typically metallized before bonding, this contamination has been found to cause problems with the subsequent metallization.

It would be desirable therefore to have an apparatus and/or method for imparting flat, smooth surfaces which form a sharp 90° corner onto copper blocks to be used as heatsinks in the manufacture of semiconductor optoelectronic devices.

SUMMARY OF THE INVENTION

An apparatus and method for imparting a sharp, defect-free outside corner of a desired angle to a metal workpiece are disclosed. The apparatus comprises two separate cutting tools, each with a distinct cutting cirection. The tools are juxtaposed such that their leading surfaces are adjacent to each other and that their respective cutting edges intersect at the desired angle. This provides that the cutting directions of each tool are opposite one another. In using the improved cutting apparatus, the workpiece is secured and the apparatus must be movable along the x, y and z axes. By cutting the first and second surfaces of the workpiece in sequence with the first and second cutting edges of the present apparatus respectively, a sharp defect-free corner of the desired angle can be imparted to the workpiece. A specific application for the present invention is in the fabrication of intricate copper products, such as heatsinks for semiconductor devices.

DETAILED DESCRIPTION OF A PREFERRED EMBODIMENT

Figure 1:
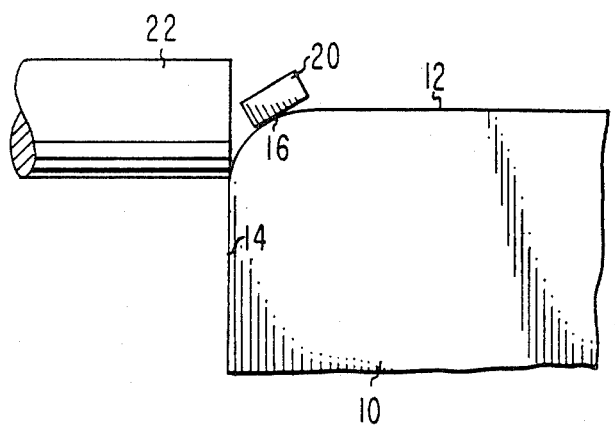
FIGS. 1, 2 and 3 illustrate problems with heatsinks fabricated by prior art machining methods.

The problems addressed by the present invention can be explained by reference to the drawing. FIG. 1 shows a section of a copper heatsink 10 whose top surface 12 and front surface 14 intersect to form a rounded corner 16. It should be noted that even heatsinks that appear to have a sharp corner to the naked eye will exhibit a substantial radius of curvature when viewed more closely. This presents difficulty in using these heatsinks for optoelectronic devices. Referring back to FIG. 1, it can be seen that the device 20 is not on the same axis as the fiber 22. In most situations it is desirable to have the device 20 and the fiber 22 axially aligned for efficient coupling of the light from the device 20 into the fiber 22. Also, it is known that the device 20 should be mounted at the very edge of the top surface 12 of the heatsink 10 to eliminate scattering of the light beam which is emitted from the device 20. When considering the 0.004"×0.006"×0.010" (100 $\mu$m×150 $\mu$m×250 $\mu$m) dimensions of a typical optoelectronic device, it becomes apparent that even a relatively small radius of curvature of the corner 16 results in misalignment of the device 20 and the fiber 22.

Figure 2:
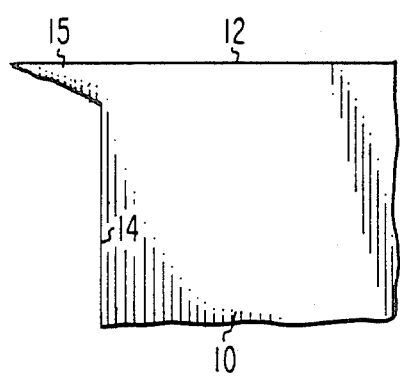
Figure 3:
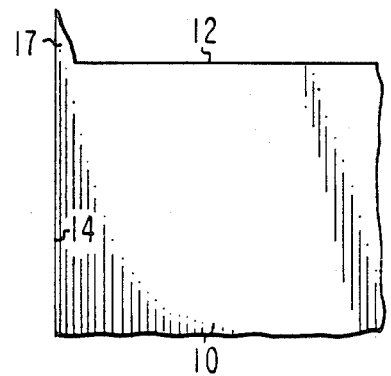

FIGS. 2 and 3 illustrate another problem encountered when fabricating copper heatsinks for optically coupled devices. In FIG. 2 the top surface 12 of the heatsink 10 has been machined by a prior art method, e.g. milling. It is common for a burr 15 to form in the plane of the machining, especially with ductile metals such as copper.

FIG. 3 shows that when the front surface 14 of the heatsink 10 is machined, a second burr 17 is formed in the plane of this secondary machining. Although subsequent remachining of the top surface 12 will remove the second burr 17, the result will be another burr 15 as in FIG. 2. No matter how much care is taken in the machining process, there will inevitably be a burr in the plane of the last machining.

Figure 4:
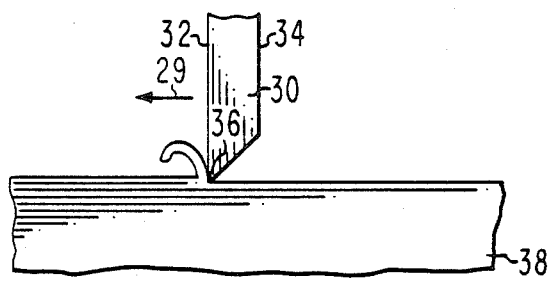
FIG. 4 illustrates generally the cutting direction of a tool as it corresponds to the shape of the tool.

FIG. 4 illustrates generally the cutting direction, indicated by the arrow 29, of a first cutting tool 30 as it removes material from a workpiece 38. It is known in the machining art that if the tool 30 is used in the opposite direction that the cutting edge 36 of the tool 30 will be damaged or destroyed and the resultant surface of the workpiece 38 will also be unsatisfactory.

Figure 5:
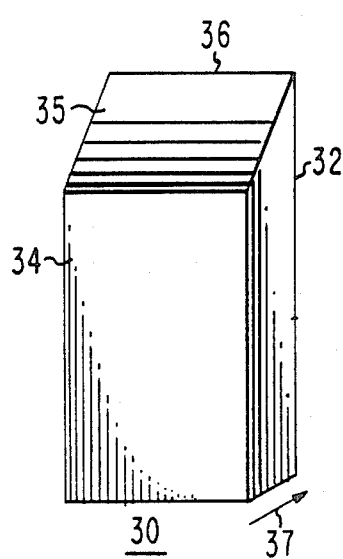
FIG. 5 illustrates a first embodiment of a cutting tool of the present invention.

FIG. 5 is another illustration of the first cutting tool 30 which has a leading surface 32, a rear surface 34 and a sloped surface 35. The leading surface 32 and the sloped surface 35 are highly polished to provide a sharp cutting edge 36. The arrow marked 37 indicates the cutting direction.

Figure 6:
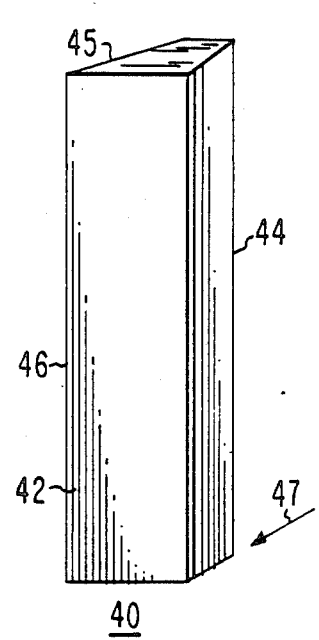
FIG. 6 illustrates a second embodiment of a cutting tool of the present invention.

A second cutting tool 40 is illustrated in FIG. 6. This second cutting tool 40 has a leading surface 42 and a rear surface 44. However, the sloped surface 45 is along the length of the tool 40 providing a longer cutting edge 46. The arrow marked 47 indicates the cutting direction.

Figure 7:
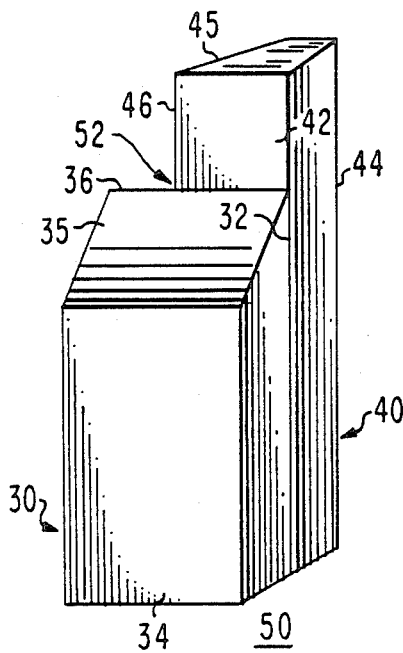
FIG. 7 illustrates the apparatus of the present invention.

FIG. 7 illustrates the cutting apparatus 50 of the present invention. The cutting apparatus 50 comprises a first cutting tool 30 and a second cutting tool 40 of FIGS. 5 and 6, respectively. These two cutting tools 30, 40 are juxtaposed such that their leading surfaces 32, 42 are adjacent to each other and that their respective cutting edges 36, 46 intersect to form an inside corner 52. FIG. 7 shows a perpendicular intersection of cutting edges 36, 46 which is used to impart a 90° corner to a workpiece. It should be apparent that other angles of intersection could be employed in the cutting apparatus 50 of the present invention as desired.

The leading surfaces 32, 42 should be highly polished not only to insure the sharpness of the cutting edges 36, 46, but also to insure a tight intersection of the cutting edges 36, 46 at the inside corner 52 of the cutting apparatus 50. Arranged in this manner, it can be seen that the first edge 36 has a cutting direction opposite to that of the second cutting edge 46. If the first and second cutting tools 30, 40 were arranged to have identical cutting directions, the first cutting edge 36 and the second cutting edge 46 would not intersect.

It was unexpected that this cutting apparatus 50, whose cutting edges 36, 46 are in opposite directions, would be useful in imparting a precise 90° corner to a workpiece. Clearly, when the cutting apparatus 50 engages the corner of a workpiece, no matter which cutting direction is used, it will be wrong for one of the cutting tools 30 or 40.

Figure 8:
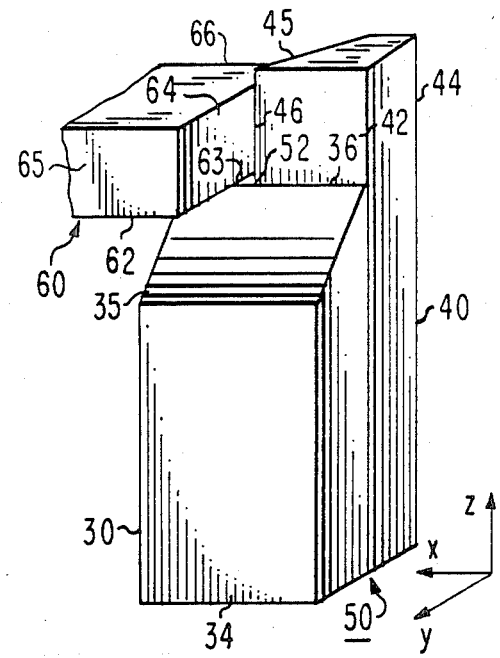
FIG. 8 shows the apparatus of the present invention as it engages a workpiece.

The method for successfully employing the cutting apparatus 50 of the present invention is best described by reference to FIG. 8. In FIG. 8 the cutting apparatus 50 is shown engaging a workpiece 60 which may be a copper heatsink having a first surface 62 and a second surface 64 which intersect at the outside corner 63.

The workpiece 60 should be held stationary in a clamp or chuck (not shown) as is known in the art. Further, the cutting apparatus 50 must be held in a clamping means (not shown) and must be movable along the x, y and z axes. Finally, the workpiece 60 and the cutting apparatus 50 should be aligned such that the first cutting edge 36 and the second cutting edge 46 are substantially parallel to the top surface 62 and the front surface 64, respectively, of the workpiece 60.

Once this rough alignment is completed, the cutting apparatus 50 should be moved in a first direction along the y axis until the first cutting edge 36 is clear of a first side 65 of the workpiece 60. The cutting apparatus 50 should then be advanced along the z axis towards the workpiece 60 a distance to provide a desired depth of cut e.g., 0.0002" (4.8 μm). The cutting apparatus 50 is then traversed in a second direction along the y axis thereby removing 0.0002" (4.8 μm) of material from that portion of the first surface 62 which is engaged by the first cutting edge 36. This sequence of steps can be repeated until the desired amount of material has been removed from the first surface 62 of the workpiece 60. The cutting of the first surface 62 by the cutting apparatus 50 of the present invention will produce a primary burr as described above in reference to FIG. 2.

Upon termination of the cutting of the first surface 62 of the workpiece 60, the cutting apparatus 50 is locked in its final position along the z axis leaving it free to move only along the x and y axes throughout the balance of the present process.

The second surface 64 of the workpiece 60 can now be cut by the cutting apparatus 50 in a sequence of steps similar to those employed in cutting the first surface 62. Specifically, the cutting apparatus 50 is moved in said second direction along the y axis, i.e. towards, and clear of a second side 66 of the workpiece 60. The cutting apparatus 50 is advanced along the x axis towards the workpiece 60 a distance to provide the desired depth of cut. Next, the cutting apparatus 50 is traversed in said first direction along the y axis, i.e. towards first side 65, thereby providing tha the second cutting edge 46 removes material from the second surface 64 of the workpiece 60. The primary burr resulting from the cutting of the first surface 62 is also removed.

Unexpectedly, when the second surface 64 is cut as described above, no secondary burr, as described above in reference to FIG. 3, is left on the workpiece corner 63. It is important to note that when the cutting apparatus 50 is traversed along the y axis and the second cutting edge 46 is cutting the second surface 64, the first cutting edge 36 is moving opposite to its cutting direction. However, the first cutting edge 36 either removes, or prevents from forming, the secondary burr with no damage to the first cutting edge 36, or the the corner 63 or either of the workpiece surfaces 62, 64. Further, the workpiece corner 63 is a sharp, near-perfect 90° corner. Also the first surface 62 and second surface 64 of the workpiece 60 are smooth and defect-free. These surfaces 62, 64 require no further polishing prior to metallization and bonding of a semiconductor device thereto.

While the present apparatus and method have been described with regard to the manufacture of copper heatsinks for semiconductor devices, it should be apparent that these can be utilized in other contexts without departing from the scope and spirit of the present invention. For instance, the precise machining of any metal or alloy for any intended purpose can be enhanced by the present invention. Particularly, soft and/or ductile materials such as copper, copper alloys, brass and aluminum work well with, and derive the most substantial benefit from, the present invention. Also, although the first and second cutting edges intersect perpendicularly in the above description, clearly other angles of intersection can be employed when desired for a particular application.

What is claimed is:

1. A cutting apparatus for imparting a sharp, defect-free corner of a desired angle to a metal workpiece comprising:
   a first cutting tool having an inclined first surface bounded by a first cutting edge which removes metal in a first cutting direction; and
   a second cutting tool having an inclined second surface bounded by a second cutting edge which removes material in a second cutting direction;
   wherein said first cutting tool and said second cutting tool are held juxtaposed such that said first cutting edge and said second cutting edge contact and intersect to form an inside corner of the desired angle, thereby orienting said first cutting direction to be opposite to said second cutting direction.

2. The apparatus of claim 1 wherein the adjacent surfaces of the juxtaposed cutting tools are polished to be smooth and flat.

3. The apparatus of claim 1 wherein the desired angle is 90 degrees.

4. A method of imparting a sharp, defect-free outside corner of a desired angle to a metal workpiece using a cutting apparatus having a first cutting edge for cutting in a first direction and having a non-cutting direction opposite said first direction and a second cutting edge which moves in unison with said first edge and has a cutting direction opposite said first direction, said first and second edges are held juxtaposed such that said first and second cutting edges intersect to form an inside corner of said desired angle and which are oriented to have opposite cutting directions, which method comprises:

(a) advancing the cutting apparatus such that the first cutting edge is a distance below a first surface of the workpiece equal to a desired depth of cut;

(b) traversing the cutting apparatus in the first cutting direction to remove material from said first surface;

(c) repeating steps (a) and (b) until the desired amount of material has been removed from said first surface of the workpiece;

(d) locking the first cutting edge in its final position with regard to said first surface after cutting of said first surface is completed;

(e) advancing the cutting apparatus such that said second cutting edge is a distance below a second surface equal to a desired depth of cut;

(f) traversing the cutting apparatus in said second cutting direction to remove material from said second surface wherein the first cutting edge moving in its non-cutting direction removes the burrs formed by said second cutting edge; and (g) repeating steps (d), (e) and (f) until the desired amount of material has been removed from said second surface to the workpiece and a sharp, defect-free corner of said desired angle is formed by the intersection of said first and second surfaces of the workpiece.

5. The method of claim 4 wherein said desired angle is 90°.

6. The method of claim 4 wherein said workpiece is a copper heatsink.

* * * * *